US012811936B2

(12) United States Patent
Knapp et al.

(10) Patent No.: US 12,811,936 B2
(45) Date of Patent: Nov. 24, 2026

(54) METHOD AND SYSTEM FOR AI-BASED VISUAL KNOWLEDGE AUTHENTICATION

(71) Applicant: Electronic Verification Systems, LLC, Louisville, KY (US)

(72) Inventors: Daniel Knapp, Louisville, KY (US); Eric Knapp, Knoxville, TN (US); James Shrewsbury, Princeton, KY (US); Islam Alhasan, Louisville, KY (US); Rachael Rolan, Denver, CO (US)

(73) Assignee: Electronic Verification Systems, LLC, Louisville, KY (US)

( * ) Notice: Subject to any disclaimer, the term of this patent is extended or adjusted under 35 U.S.C. 154(b) by 116 days.

(21) Appl. No.: 18/923,135

(22) Filed: Oct. 22, 2024

(65) Prior Publication Data

US 2026/0113321 A1 Apr. 23, 2026

(51) Int. Cl.
*H04L 9/40* (2022.01)

(52) U.S. Cl.
CPC ................................ *H04L 63/0884* (2013.01)

(58) Field of Classification Search
CPC .................................................. H04L 63/0884
See application file for complete search history.

(56) References Cited

U.S. PATENT DOCUMENTS

| | | | | |
|---|---|---|---|---|
| 2017/0300686 | A1* | 10/2017 | Shyu | G06F 21/36 |
| 2020/0098467 | A1* | 3/2020 | Chakra | G16H 20/70 |
| 2021/0357489 | A1* | 11/2021 | Tali | G06F 21/32 |
| 2022/0247762 | A1* | 8/2022 | Jasleen | H04L 63/20 |
| 2025/0158822 | A1* | 5/2025 | Edwards | H04L 9/3213 |
| 2025/0298883 | A1* | 9/2025 | Mehtani | G06F 21/36 |
| 2026/0044911 | A1* | 2/2026 | Encarnacion | G06Q 50/18 |

* cited by examiner

*Primary Examiner* — Noura Zoubair
*Assistant Examiner* — Alec C Ankrum
(74) *Attorney, Agent, or Firm* — The Rapacke Law Group

(57) ABSTRACT

A system, method, and non-transitory computer-readable medium for automated visual knowledge authentication based on user-related data are disclosed. A processor of a visual authentication server (VAS) node hosts a machine learning (ML) module and connects to at least one user-entity node over a network. The processor receives an authentication request comprising user profile data, derives the user profile data, and parses the user profile data to derive a plurality of key classifying features. A local authentication database is queried to retrieve local historical user authentication-related data based on the key classifying features. At least one classifier feature vector is generated and provided to the ML module, which generates an authentication predictive model that produces at least one recognizable media generation parameter. A recognizable media is generated for the at least one user-entity node based on the recognizable media generation parameter.

16 Claims, 7 Drawing Sheets

300

METHOD AND SYSTEM FOR AI-BASED VISUAL KNOWLEDGE AUTHENTICATION

FIELD OF DISCLOSURE

The present disclosure generally relates to user authentication, and more particularly, to an AI-based automated system and method for visual knowledge authentication based on user-related data.

BACKGROUND

Traditional Knowledge-Based Authentication (KBA) involves presenting a user with text-based questions related to their personal information, such as loan details or past addresses. The user must select the correct written response to verify their identity and prevent fraud.

For example, U.S. Patent Application No. 2023/254,699 to Capital One Services LLC (hereinafter "Capital Publication"). The Capital Publication discloses a systems, methods, and compute program product that relates to knowledge-based authentication leveraging mobile-device photos and assets. In one embodiment, the system can identify, by employing a machine learning model, a plurality of authentication resources associated with a user, wherein the machine learning model is trained using historical information efficacy of authentication challenges. In another embodiment, the system can select a mobile-device photo and a mobile-device asset associated with the user from the plurality of authentication resources. In another embodiment, the system can select a synthetic photo consistent with the mobile-device photo. In another embodiment, the system can generate a challenge that includes the mobile-device photo, the mobile-device asset and the synthetic photo. In another embodiment, the system can authenticate with knowledge-based authentication based upon accuracy of a reply received in response to the challenge.

U.S. Patent Application No. 2023/153,415 to Lisa Cheng (hereinafter "Lisa Publication"). The Lisa Publication discloses a system, method, and non-transitory computer readable medium that relates to identity verification and authorization method. In one embodiment, the system can generate and send a message to a device associated with a user based on an initiated request from the user and a determination the user should be authenticated, wherein the message requests a content-based response from the user to authenticate the user. In another embodiment, the system can receive the content-based response from the user in reply to the message, wherein the content-based response comprises SMS (short message service) metadata, emoji, photo, video, audio, or a combination thereof. In another embodiment, the system can authenticate the user based on a determination of a confirmed match between the content-based response from the user and a response key preselected by the user.

As yet another example, IN Patent Application No. 2024/41,041,245 to Gokaraju Rangaraju Institute of Engineering and Technology (hereinafter "Gokaraju Publication"). The Gokaraju Publication discloses a Pictorial Password Authentication Systems that offers a compelling alternative, employing images instead of alphanumeric strings for authentication. Cued Click Points (CCP) stands out as a graphical password method within this framework, utilizing a click-based mechanism where users select points on displayed images to form their password sequence. By shifting away from text-based passwords, our aim is to enhance security by encouraging users to create stronger and more diverse passwords. This approach holds promise across various domains, including banking applications, e-commerce platforms, personal devices, and social media networks, thereby bolstering overall cybersecurity measures.

IN Patent Application No. 2023/41,076,973 to Dr. G Satyavathy (hereinafter "Satyavathy Publication"). The Satyavathy Publication discloses a novel graphical password authentication system that aims to enhance both security and usability. The proposed system offers users an innovative way to create and authenticate their passwords using images. By leveraging visual elements, the graphical password system aims to make the authentication process more intuitive and user-friendly. Users have the flexibility to choose from various graphical password schemes, including pattern-based, image-based, depending on their preferences and capabilities. To ensure robust security, the system employs advanced encryption techniques such as hashing and salting to protect stored passwords. Additionally, measures are implemented to prevent brute-force attacks and other common security threats. The graphical password project also explores the possibility of integrating multi-factor authentication for an added layer of protection. Throughout the development process, special attention is given to user education and clear documentation. Users are provided with guidelines on creating strong and memorable graphical passwords, as well as best practices for keeping their credentials confidential. Furthermore, user feedback is collected and analyzed to continuously improve the system's usability and security.

However, the existing systems lack adequate protection from fraud as a fraudulent user can generate passwords and textual answers. Furthermore, the existing KBA systems do not use AI-based predictive analytics for user authentication.

Accordingly, an improved KBA system and method for AI-based visual knowledge authentication based on user-related data are desired.

BRIEF OVERVIEW

This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

One embodiment of the present disclosure provides a system for an automated visual knowledge authentication based on user-related data including a processor of a visual authentication server (VAS) node configured to host a machine learning (ML) module and connected to at least one user-entity node over a network and a memory on which are stored machine-readable instructions that when executed by the processor, cause the processor to: receive an authentication request including user profile data from the at least one user-entity node; derive the user profile data from the authentication request; parse the user profile data to derive a plurality of key classifying features; query a local authentication database to retrieve local historical user authentication-related data based on the plurality of key classifying features; generate at least one classifier feature vector based on the plurality of key classifying features and the local historical user authentication-related data; provide the at least one classifier feature vector to the ML module configured to generate an authentication predictive model for producing at least one intuitively recognizable media generation parameter; and generate an intuitively recognizable media for the at least one user-entity node based on the at least one at least one intuitively recognizable media generation parameter.

Another embodiment of the present disclosure provides a method that includes one or more of: receiving an authentication request including user profile data from the at least one user-entity node; deriving the user profile data from the authentication request; parse the user profile data to derive a plurality of key classifying features; querying a local authentication database to retrieve local historical user authentication-related data based on the plurality of key classifying features; generating at least one classifier feature vector based on the plurality of key classifying features and the local historical user authentication-related data; providing the at least one classifier feature vector to the ML module configured to generate an authentication predictive model for producing at least one intuitively recognizable media generation parameter; and generating an intuitively recognizable media for the at least one user-entity node based on the at least one at least one intuitively recognizable media generation parameter.

Another embodiment of the present disclosure provides a computer-readable medium including instructions for: receiving an authentication request including user profile data from the at least one user-entity node; deriving the user profile data from the authentication request; parse the user profile data to derive a plurality of key classifying features; querying a local authentication database to retrieve local historical user authentication-related data based on the plurality of key classifying features; generating at least one classifier feature vector based on the plurality of key classifying features and the local historical user authentication-related data; providing the at least one classifier feature vector to the ML module configured to generate an authentication predictive model for producing at least one intuitively recognizable media generation parameter; and generating an intuitively recognizable media for the at least one user-entity node based on the at least one at least one intuitively recognizable media generation parameter.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings may contain representations of various trademarks and copyrights owned by the Applicant. In addition, the drawings may contain other marks owned by third parties and are being used for illustrative purposes only. All rights to various trademarks and copyrights represented herein, except those belonging to their respective owners, are vested in and the property of the Applicant. The Applicant retains and reserves all rights in its trademarks and copyrights included herein, and grants permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. In the drawings.

DETAILED DESCRIPTION

Figure 1A:
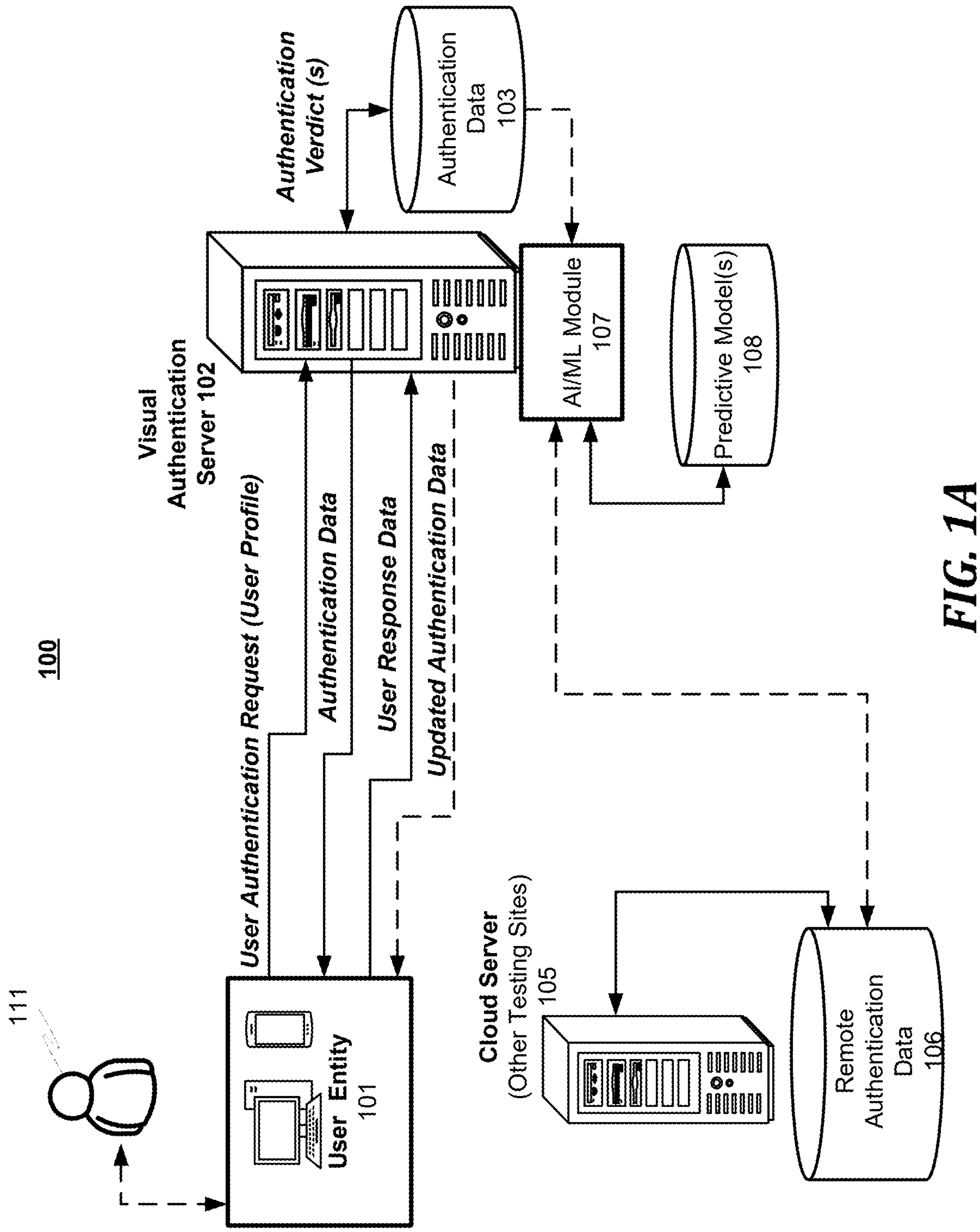
FIG. 1A illustrates a network diagram of a system for an AI-based visual knowledge authentication based on user-related data consistent with the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such a term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S. C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subject matter disclosed under the header.

The present disclosure includes many aspects and features. Moreover, while many aspects and features relate to, and are described in the context of the predictive visual KBA, embodiments of the present disclosure are not limited to use only in this context.

The present disclosure provides a system, method and computer-readable medium for AI-based visual knowledge authentication based on user-related data. In one embodiment, the system and method overcome the limitations of existing methods of text-based authentication by employing fine-tuned models to extract and process the user response(s) information with respect to image selection, irrespective of data format, style, or data type. By leveraging the capabilities of the predictive models, the disclosed approach offers a significant improvement over existing solutions discussed above in the background section.

The present disclosure is directed to a system and method for using visual or graphic images (or media data) for electronic verification services. The disclosed embodiments introduce a dynamic visual knowledge-based authentication system (DVKBA). As discussed in the background section, the DVKBA provides and enhancement in a form of a visual component to the traditional Knowledge Based Authentication (KBA) process. The disclosed method and system enhance the authentication process by replacing text-based answers with images and/or media data. For instance, instead of choosing a written address, users may select an image of their current or previous residence, thereby verifying their identity through visual recognition.

The disclosed embodiment may involve multiple steps and may be integrated into various platforms. In one embodiment, human operators on the authentication platform may send both traditional KBA and DVKBA questions to users to verify their identity. The process begins with selecting an appropriate set of questions, which are then presented to the user. In one embodiment, the user must choose the correct image associated with their personal information, such as identifying their residence from a set of property images.

Additionally, the disclosed authentication system may be accessed via a web API, allowing seamless integration with other platforms. Through the API, clients can request KBA and DVKBA questions and receive corresponding images and correct answers. The clients may then display these questions on their own interfaces, enabling them to leverage visual authentication to verify their users' identities.

In one embodiment, the disclosed authentication system performs the following:

- Gathers data from a wide range of personal information sources about the individual to be authenticated;
- Randomly selects a previous address or one of the addresses associated with the individual;
- Sources real images of that address (e.g., house, apartment building, etc.);
- Using advanced logic including AI-based predictive modeling, the system selects similar but incorrect images to display alongside the correct one; and
- Then, the system presents the user with multiple images and the user must select the one that accurately represents their previous address.

In one embodiment, the authentication system selects addresses for authentication images using a weighted random algorithm that prioritizes more recent residences. Addresses where the user has lived more recently have a higher probability of being selected. This balances security and user familiarity, as users are more likely to recognize recent residences. This, advantageously, provides for a unique method of enhancing user experience and authentication reliability.

In another embodiment, the system may employ a Property Categorization Model (PCM) that analyzes and categorizes images of properties based on features such as architectural style, size, and color. The PCM may ensure that decoy images are appropriately similar to the images of the user's actual residence, making it more challenging for unauthorized users to guess correctly. While the disclosed embodiments use proprietary AI models for generation and modification of authentication images, existing models such as Stability AI's Stable Diffusion or Timbrooks' InstructPix2Pix may be used to create realistic images that maintain user recognition while enhancing security. In one embodiment, to ensure the quality and effectiveness of the generated images, the authentication system may evaluate images using established metrics such as Fréchet Inception Distance (FID), Structural Similarity Index Measure (SSIM), Precision and Recall, and Inception Score. This image evaluation process is crucial for maintaining high authentication standards and user trust.

While an arbitrary authentication time may be selected, the disclosed system may impose a 10-second time limit for the user to select the correct image during the authentication process. This time constraint reduces the risk of unauthorized access by limiting the window for potential attackers to analyze and guess the correct image. Including this detail emphasizes the security measures inherent in our system and protects our method of using time constraints as a security feature.

While several authentication attempts may be allowed, the disclosed system may allow only one attempt per verification session. If the user fails to authenticate successfully, they must initiate a new session to try again. This limitation prevents brute-force attacks and adds an additional security layer.

In one embodiment, in cases where an image of the user's residence is unavailable or cannot be generated, the system defaults to traditional KBA questions (e.g., "What is the name of your first pet?"). This fallback mechanism ensures continuity of service and maintains security standards. In yet other embodiments, the user is presented with multiple AI-generated images (or media data) one of which represents intuitively recognizable image such as, for example, an image of a similar pet that he/she has or had, a video of their favorite vocation destination, an image resembling a relative, etc., etc. The intuitively recognizable data is generated by the AI/Machine Learning module based on collected pre-stored heuristics.

This disclosed embodiment may address the situations where there is no pre-stored image data for the user residence. In this case, the system can use AI to predict a most intuitively recognizable image for user verification. For example, it may be a picture of a dog or cat of the same exact breed (but not the exact user's dog or cat), a car of a particular model and color, a picture of his/her favorite book, painting, a very familiar face, etc. etc. So, the user will receive several random AI-generated images and one intuitively recognizable AI-generated image or media data. The user may be asked simple questions such as "Which image relates to you the most?" or "Which image has an emotional connection?".

Thus, the intuitively recognizable image (IRI) or media data is generated based on minimal user profile data. The AI may search through user's social media, pictures, contacts, groups, etc. to generate the accurate IRI. Data/heuristics from other users of the same type (age, gender, location, nationality, hobbies, occupation, etc.) may be used as well for generation of a feature vector to be provided to the machine-learning module to fine tune an authentication predictive model(s). The predictive IRI generation parameters may be derived from the authentication predictive model(s) and the IRI may be generated based on the predictive intuitively recognizable media generation parameters. User verification based on the DVKBA is implemented in the same manner regardless of the nature and the type of the authentication data provided to the user. In this implementation the DVKBA becomes truly dynamic.

In one embodiment of the present disclosure, the system provides for an AI and machine learning (ML)-generated intuitively recognizable media generation parameters for based on analysis of the initial KBA question and user response data. In one embodiment, an automated authentication predictive model may be generated to provide for intuitively recognizable media generation parameters associated with the user being authenticated. The authentication predictive model may use historical user authentication-related data collected at the current authentication location (or website) and at authentication locations of the same type located within a certain range from the current location or even located globally on different networks. The relevant historical user authentication-related data may include data related to other users having the same parameters such as type of age, gender, residence area, occupation, language of the jurisdiction, nationality, etc. The relevant authentication-related data may indicate successfully selected images, answered questions based on authentication records and logs.

In one embodiment, to enhance this process, the system may integrate advanced technologies discussed above, such as Artificial Intelligence (AI) and machine-learning (ML) and Blockchain. The AI may be leveraged for several key functions in the manner discussed herein.

Additionally, the disclosed authentication system may incorporate Blockchain technology to ensure the transparency and immutability of transactions, providing a secure and trustworthy platform. By embedding these advanced technologies, the disclosed automated predictive authentication system, advantageously, offers a sophisticated and secure solution.

As discussed above, in one disclosed embodiment, the AI/ML technology may be combined with a blockchain technology for secure use of the user entity-related data and authentication-related data. In one embodiment, users (e.g., persons being authenticated) may logon into authentication system implemented via an AI-based chatbot that may ask questions or type back additional questions or hints and maintain a responsive conversation. Once the authentication session is completed, an authentication verdict is generated and sent to a requesting entity (e.g., bank, crypto account access system, medical account access system, etc.). In one embodiment, a blockchain consensus among several entities may need to be implemented prior to a provision of the final authentication verdict to the user who had participated in the authentication session.

In one embodiment, the secure authentication chat channel may be implemented using a ChatBot. The authentication-related data and/or documents and verdicts may be stored in a form of uniquely minted NFTs on a private (permissioned) blockchain ledger.

In one embodiment, the ML module may use authentication predictive models that use an artificial neural network (ANN) to generate predictive intuitively recognizable media generation parameters and update parameters for additional rounds of authentication. The use of specially trained ANNs provides a number of improvements over traditional methods of analyzing of user profile data received from the user being authenticated, including more accurate prediction of what additional or leading media data and/or questions need to be generated by authentication entities. The application further provides methods for training the ANN that leads to a more accurate authentication predictive model(s).

In one embodiment, the ANN can be implemented by means of computer-executable instructions, hardware, or a combination of the computer-executable instructions and hardware. In one embodiment, neurons of the ANN may be represented by a register, a microprocessor configured to process input signals. Each neuron produces an output, or activation, based on an activation function that uses the outputs of the previous layer and a set of weights as inputs. Each neuron in a neuron array may be connected to another neuron via a synaptic circuit. A synaptic circuit may include a memory for storing a synaptic weight. A proposed ANN may be implemented as a Deep Neural Network having an input layer, an output layer, and several fully connected hidden layers. The proposed ANN may be particularly useful in authentication updates because the ANN can effectively extract features from the user answer data and image (or media) selection in linear and non-linear relationships. In some embodiments, the proposed ANN may be implemented by an application-specific integrated circuit (ASIC). The ASICs may be specially designed and configured for a specific AI application and provide superior computing capabilities and reduced electricity and computational resources consumption compared to the traditional CPUs.

FIG. 1A illustrates a network diagram of a system for an AI-based visual knowledge authentication based on user-related data consistent with the present disclosure.

Referring to FIG. 1A, the example network 100 includes the Visual Authentication Server (VAS) node 102 connected to a cloud server node(s) 105 over a network. The VAS node 102 is configured to host an AI/ML module 107 coupled to the ANN (shown in FIG. 4). The VAS node 102 may receive a user response/selection data from the user-entity node 101 associated with the user 111 being authenticated. The VAS node 102 may receive conversation data related to communication between the user entity 101 and the authenticator entity represented by a ChatBot (not shown) supported by the AI/ML module 107 of the VAS node 102.

The user response data may have language indicator metadata representing the language of the user 111 used during the authentication-related communication. In one embodiment, the user response data may be processed by the VAS node 102 using the pre-trained large language models. The VAS node 102 may derive the language indicator and parse out the user response data based on the language indicator metadata. In other words, the key features of the user response data may be, advantageously, derived from the user response data based on the language of the user response or email, text or other communication.

In one embodiment, the language indicator may serve as a kind of a linguistic profile associated with the user 111. The language indicator may guide the AI/ML module 107 in dynamically tailoring the intuitively recognizable media generation parameters for the authentication processing. Depending on the language indicated, the VAS node 102 may engage specialized language models or apply unique natural language processing techniques optimized for that language.

Regarding the global reach of the disclosed system and method, a cultural intelligence layer may be added to the language indicator. The goal of this layer is for the system to not only recognize the language, but also adapt its recommendations and interactions to be culturally sensitive and appropriate for the user 111 being authenticated or verified. In one embodiment, the disclosed system may employ integrated translation capabilities. The language indicator metadata may support the authentication process, making the system truly globally effective.

The VAS node 102 may query a local user authentication database 103 for the historical local user authentication-related data associated with the current user entity 101 node and the previous authentication data. The VAS node 102 may acquire relevant remote user authentication data from a remote database 106 residing on the cloud server 105. The user authentication data in the database 106 may be collected from other authentication sites or facilities. The remote user authentication data may be collected from the user entities associated with the users of the same (or similar) type, age, gender, location, language, race, etc. as the local user 111 based on a user 111 profile.

The VAS node 102 may generate a feature vector or classifier data based on the user profile data and the collected heuristics data (i.e., pre-stored local authentication data 103 and remote authentication data 106). The VAS node 102 may ingest the feature vector/classifier data into an AI/ML module 107. The AI/ML module 107 may generate a predictive authentication model(s) 108 based on the feature vector/classifier data to predict intuitively recognizable media generation parameters for automatically generating an intuitively recognizable media for authentication of the user 111. The intuitively recognizable media generation parameters may be further analyzed by the VAS node 102 prior to generation of the actual updated intuitively recognizable media. In one embodiment, the intuitively recognizable media generation parameters may be used for adjustment of the subsequent rounds of authentication. Once the authentication session is timed out, the user authentication answers are media selections may be analyzed to generate an authentication verdict by the VAS node 102.

Figure 1B:
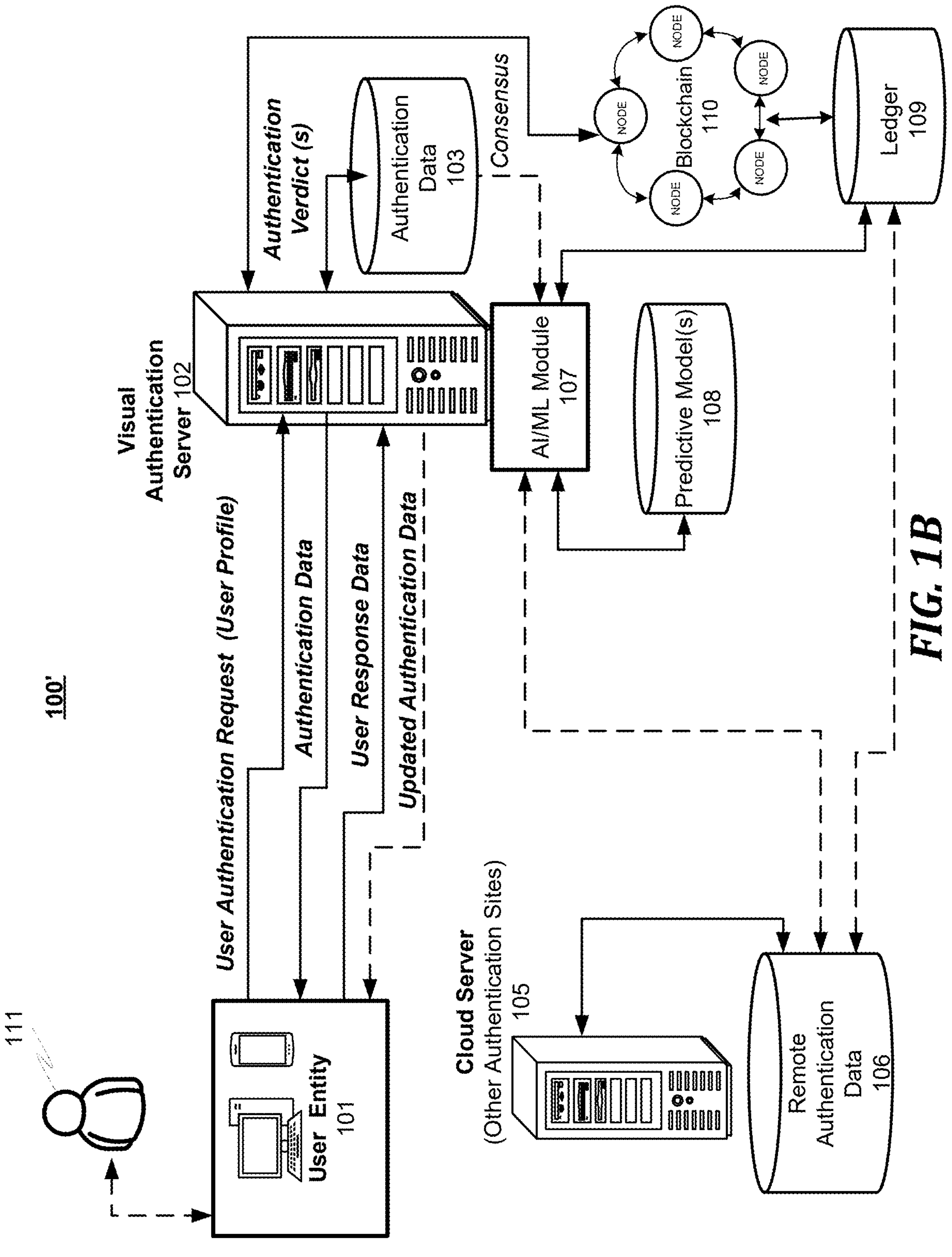
FIG. 1B illustrates a network diagram of a system for an AI-based visual knowledge authentication based on user-related data implemented over a blockchain network consistent with the present disclosure.

FIG. 1B illustrates a network diagram of a system for an AI-based visual knowledge authentication based on user-related data implemented over a blockchain network consistent with the present disclosure.

Referring to FIG. 1B, the example network 100' includes the Visual Authentication Server (VAS) node 102 connected to a cloud server node(s) 105 over a network.

Figure 4:
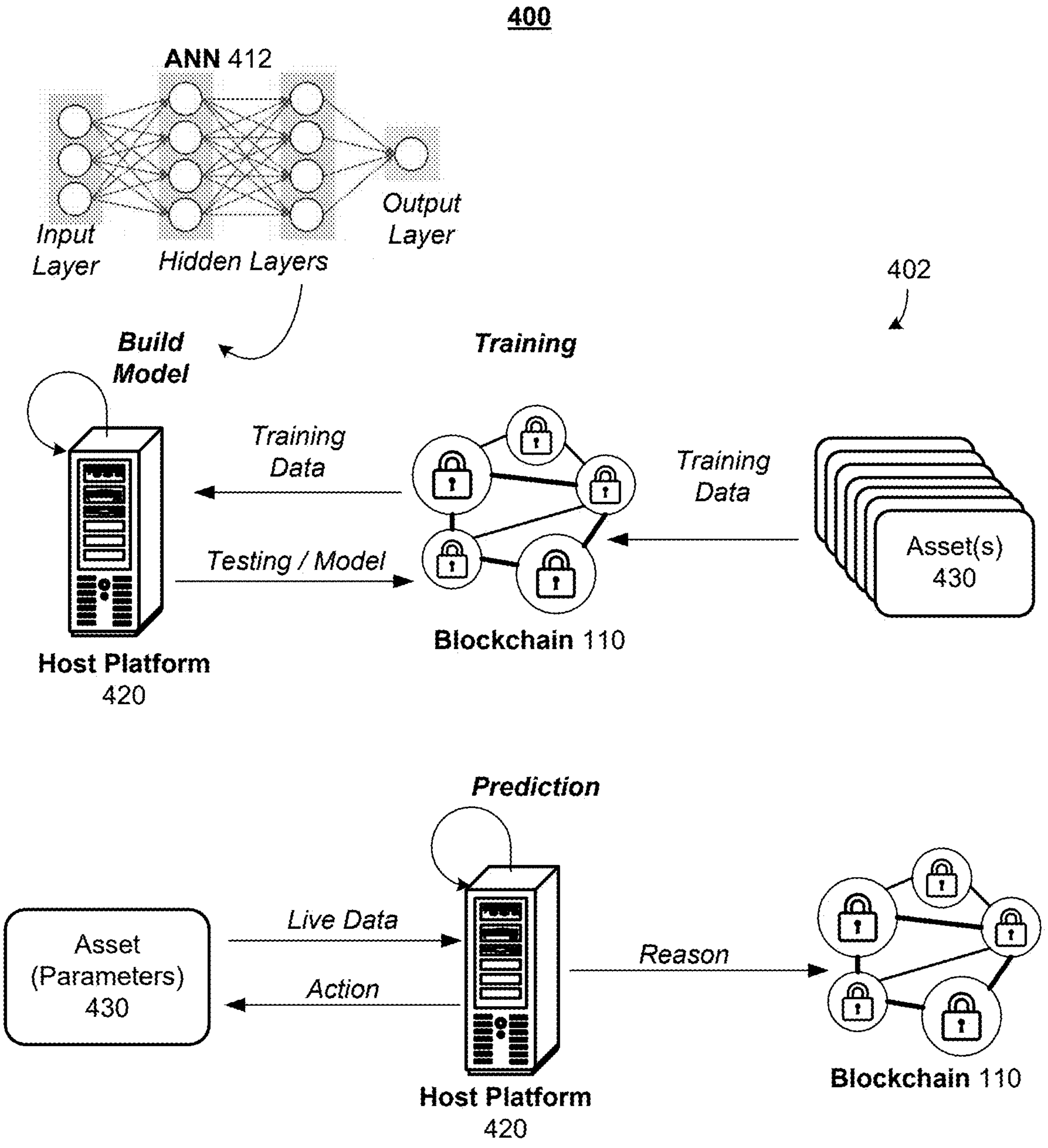
FIG. 4 illustrates deployment of a machine learning model for prediction of intuitively recognizable media generation parameters using blockchain assets consistent with the present disclosure.

The VAS node 102 is configured to host an AI/ML module 107 coupled to the ANN (shown in FIG. 4). The VAS node 102 may receive a user response/selection data from the user-entity node 101 associated with the user 111 being authenticated. The VAS node 102 may receive conversation data related to communication between the user entity 101 and the authenticator entity represented by a ChatBot (not shown) supported by the AI/ML module 107 of the VAS node 102.

The user response data may have language indicator metadata representing the language of the user 111 used during the authentication-related communication. In one embodiment, the user response data may be processed by the VAS node 102 using the pre-trained large language models. The VAS node 102 may derive the language indicator and parse out the user response data based on the language indicator metadata. In other words, the key features of the user response data may be, advantageously, derived from the user response data based on the language of the user response or email, text or other communication.

In one embodiment, the language indicator may serve as a kind of a linguistic profile associated with the user 111. The language indicator may guide the AI/ML module 107 in dynamically tailoring the intuitively recognizable media generation parameters for the authentication processing. Depending on the language indicated, the VAS node 102 may engage specialized language models or apply unique natural language processing techniques optimized for that language.

Regarding the global reach of the disclosed system and method, a cultural intelligence layer may be added to the language indicator. The goal of this layer is for the system to not only recognize the language, but also adapt its recommendations and interactions to be culturally sensitive and appropriate for the user 111 being authenticated or verified. In one embodiment, the disclosed system may employ integrated translation capabilities. The language indicator metadata may support the authentication process, making the system truly globally effective.

The VAS node 102 may query a local user authentication database 103 for the historical local user authentication-related data associated with the current user entity 101 node and the previous authentication data. The VAS node 102 may acquire relevant remote user authentication data from a remote database 106 residing on the cloud server 105. The user authentication data in the database 106 may be collected from other authentication sites or facilities. The remote user authentication data may be collected from the user entities associated with the users of the same (or similar) type, age, gender, location, language, race, etc. as the local user 111 based on a user 111 profile.

The VAS node 102 may generate a feature vector or classifier data based on the user profile data and the collected heuristics data (i.e., pre-stored local authentication data 103 and remote authentication data 106). The VAS node 102 may ingest the feature vector/classifier data into an AI/ML module 107. The AI/ML module 107 may generate a predictive authentication model(s) 108 based on the feature vector/classifier data to predict intuitively recognizable media generation parameters for automatically generating an intuitively recognizable media for authentication of the user 111. The intuitively recognizable media generation parameters may be further analyzed by the VAS node 102 prior to generation of the actual updated intuitively recognizable media. In one embodiment, the intuitively recognizable media generation parameters may be used for adjustment of the subsequent rounds of authentication. Once the authentication session is timed out, the user authentication answers are media selections may be analyzed to generate an authentication verdict by the VAS node 102.

In one embodiment, the VAS node 102 may receive the intuitively recognizable media generation parameters from a permissioned blockchain 110 ledger 109 based on a consensus from some authentication entity nodes (nots shown) confirming the answers or user authentication media selections. Additionally, confidential historical user-related information and previous users-related authentication data and user responses-related parameters may also be acquired from the permissioned blockchain 110. The newly acquired user authentication data with corresponding predicted intuitively recognizable media generation parameters data may be also recorded on the ledger 109 of the blockchain 110 so it can be used as training data for the predictive authentication model(s) 108.

In this implementation the VAS node 102, the cloud server 105, the authentication entity nodes (not shown) and the user entities(s) 101 may serve as blockchain 110 peer nodes. In one embodiment, local data from the database 103 and remote data from the database 106 may be duplicated on the blockchain ledger 109 for higher security of storage.

The AI/ML module 107 may generate a predictive authentication model(s) 108 to predict the intuitively recognizable media generation parameters in response to the specific relevant pre-stored user authentication-related data (e.g., residence image data) acquired from the blockchain 110 ledger 109. This way, the current intuitively recognizable media generation parameters may be predicted based not only on the current user entity 101-*related* data, but also based on the previously collected heuristics. After the authentication verdict generation is completed, the related authentication records and logs may be converted into unique secure NFT assets to be recorded on the blockchain to be used for future authentication models' training.

In one embodiment, as a second round of approval, a blockchain consensus may be achieved among the authorized intermediary entities in order to approve the authentication verdict generated by the VAS node 102.

Figure 2:
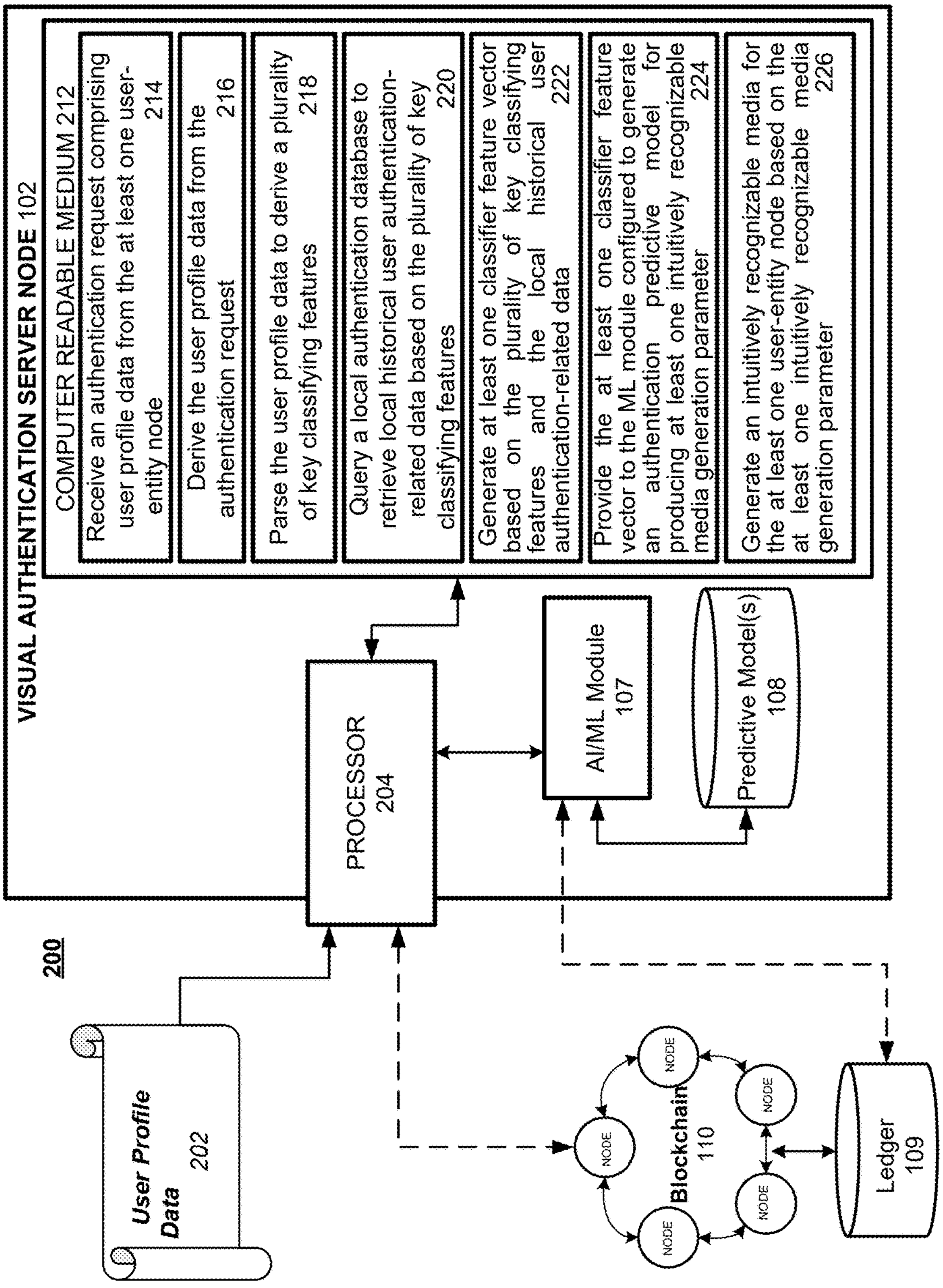
FIG. 2 illustrates a network diagram of a system including detailed features of a Visual Authentication Server (VAS) node consistent with the present disclosure.

FIG. 2 illustrates a network diagram of a system including detailed features of a Visual Authentication Server (VAS) node consistent with the present disclosure.

Referring to FIG. 2, the example network 200 includes the VAS node 102 connected to the user entity 101 (see FIGS. 1A-B) to receive the user response data 202. The VAS node 102 may provide updated authentication data if the initial user media selection produced a negative authentication verdict.

The VAS node 102 is configured to host an AI/ML module 107. As discussed above with respect to FIGS. 1A-B, the VAS node 102 may receive the user response data 202 and pre-stored user authentication-related data retrieved from the local and remote databases. As discussed above, the pre-stored user authentication-related data may be retrieved from the ledger 109 of the permissioned blockchain 110.

The AI/ML module 107 may generate a predictive authentication model(s) 108 based on the received user profile data 202 provided by the VAS node 102. As discussed above, the AI/ML module 107 may provide predictive outputs data in the form of intuitively recognizable media generation parameters for automatic generation of updated intuitively recognizable media. The VAS node 102 may process the predictive outputs data received from the AI/ML module 107 to generate an authentication verdict based on the user selection of the intuitively recognizable media.

In one embodiment, the VAS node 102 may continually monitor the user profile data and may detect a parameter that deviates from a previous recorded parameter (or from a median reading value) by a margin that exceeds a threshold value pre-set for this particular parameter. For example, if user's 111 residence changes, this may cause a change in authentication images or media. Accordingly, once the threshold is met or exceeded by at least one parameter of the user entity-related data, the VAS node 102 may provide the currently acquired user profile-related parameter to the AI/ML module 107 to generate an updated intuitively recognizable media generation parameter based on the current user 111—related data.

While this example describes in detail only one VAS node 102, multiple such nodes may be connected to the network and to the blockchain 110. It should be understood that the VAS node 102 may include additional components and that some of the components described herein may be removed and/or modified without departing from a scope of the VAS node 102 disclosed herein. The VAS node 102 may be a computing device or a server computer, or the like, and may include a processor 204, which may be a semiconductor-based microprocessor, a central processing unit (CPU), an application specific integrated circuit (ASIC), a field-programmable gate array (FPGA), and/or another hardware device. Although a single processor 204 is depicted, it should be understood that the VAS node 102 may include multiple processors, multiple cores, or the like, without departing from the scope of the VAS node 102 system.

The VAS node 102 may also include a non-transitory computer readable medium 212 that may have stored thereon machine-readable instructions executable by the processor 204. Examples of the machine-readable instructions are shown as 214-226 and are further discussed below. Examples of the non-transitory computer readable medium 212 may include an electronic, magnetic, optical, or other physical storage device that contains or stores executable instructions. For example, the non-transitory computer readable medium 212 may be a Random-Access memory (RAM), an Electrically Erasable Programmable Read-Only Memory (EEPROM), a hard disk, an optical disc, or other type of storage device.

The processor 204 may fetch, decode, and execute the machine-readable instructions 214 to receive an authentication request including user profile data from the at least one user-entity node 101 (FIG. 1A-B). The processor 204 may fetch, decode, and execute the machine-readable instructions 216 to derive the user profile data from the authentication request. The processor 204 may fetch, decode, and execute the machine-readable instructions 218 to parse the user profile data to derive a plurality of key classifying features. The processor 204 may fetch, decode, and execute the machine-readable instructions 220 to query a local authentication database to retrieve local historical user authentication-related data based on the plurality of key classifying features.

The processor 204 may fetch, decode, and execute the machine-readable instructions 222 to generate at least one classifier feature vector based on the plurality of key classifying features and the local historical user authentication-related data. The processor 204 may fetch, decode, and execute the machine-readable instructions 224 to provide the at least one classifier feature vector to the ML module configured to generate an authentication predictive model for producing at least one intuitively recognizable media generation parameter.

The processor 204 may fetch, decode, and execute the machine-readable instructions 226 to generate an intuitively recognizable media for the at least one user-entity node based on the at least one intuitively recognizable media generation parameter.

As a non-limiting example, the consensual approval of the authentication verdict may be associated with a request for additional data such as additional image or media selections, etc. The permissioned blockchain 110 may be configured to use one or more smart contracts that manage transactions for multiple participating nodes and for recording the transactions on the ledger 109.

Figure 3A:
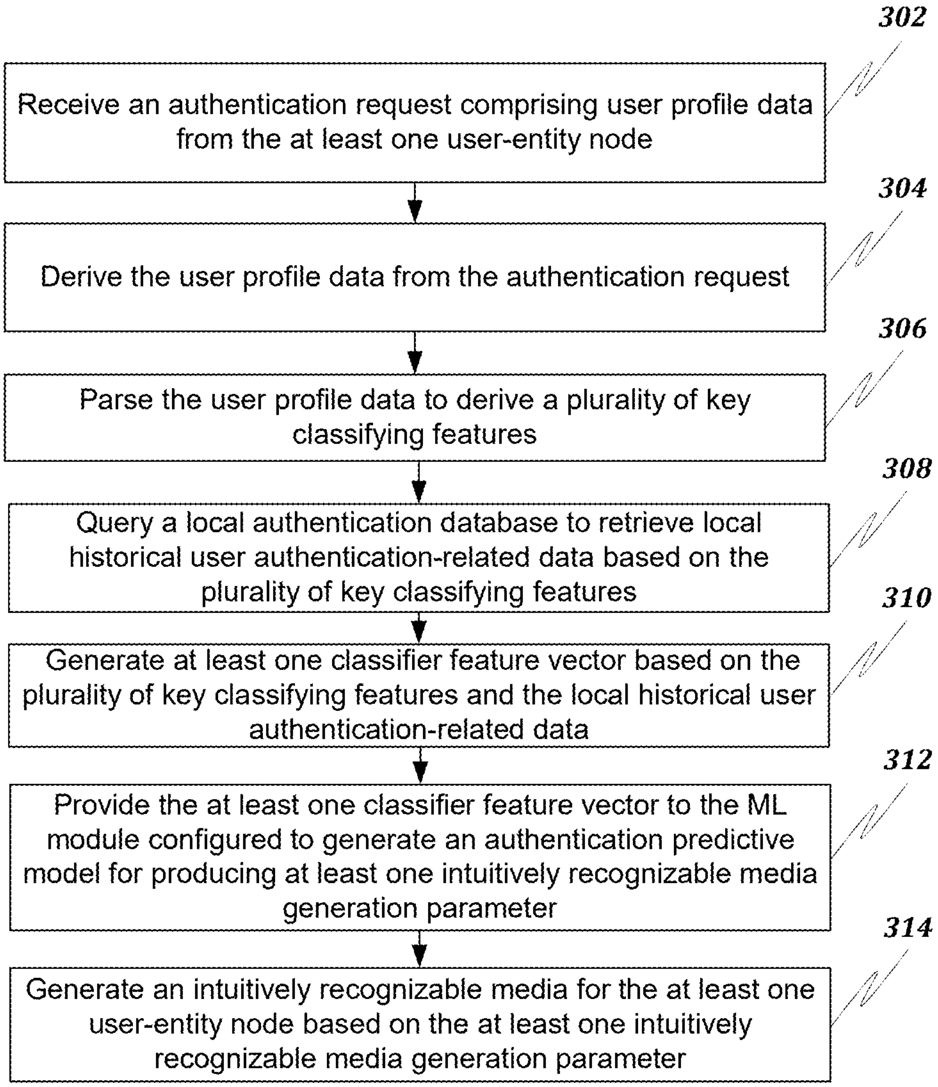
FIG. 3A illustrates a flowchart of a method for an AI-based visual knowledge authentication based on user-related data consistent with the present disclosure.

FIG. 3A illustrates a flowchart of a method for an AI-based visual knowledge authentication based on user-related data consistent with the present disclosure.

Referring to FIG. 3A, the method 300 may include one or more of the steps described below. FIG. 3A illustrates a flow chart of an example method executed by the VAS node 102 (see FIG. 2). It should be understood that method 300 depicted in FIG. 3A may include additional operations and that some of the operations described therein may be removed and/or modified without departing from the scope of the method 300. The description of the method 300 is also made with reference to the features depicted in FIG. 2 for purposes of illustration. Particularly, the processor 204 of the VAS node 102 may execute some or all of the operations included in the method 300.

With reference to FIG. 3A, at block 302, the processor 204 may receive an authentication request comprising user profile data from the at least one user-entity node.

At block 304, the processor 204 may derive the user profile data from the authentication request. Note that the intuitively recognizable media may any of: audio data, video data, imaging data and textual data or a combination of any of these types of data. At block 306, the processor 204 may parse the user profile data to derive a plurality of key classifying features. At block 308, the processor 204 may query a local authentication database to retrieve local historical user authentication-related data based on the plurality of key classifying features. At block 310, the processor 204 may generate at least one classifier feature vector based on the plurality of key classifying features and the local historical user authentication-related data.

At block 312, the processor 204 may provide the at least one classifier feature vector to the ML module configured to generate an authentication predictive model for producing at least one intuitively recognizable media generation parameter. At block 314, the processor 204 may generate an intuitively recognizable media for the at least one user-entity node based on the at least one intuitively recognizable media generation parameter.

Figure 3B:
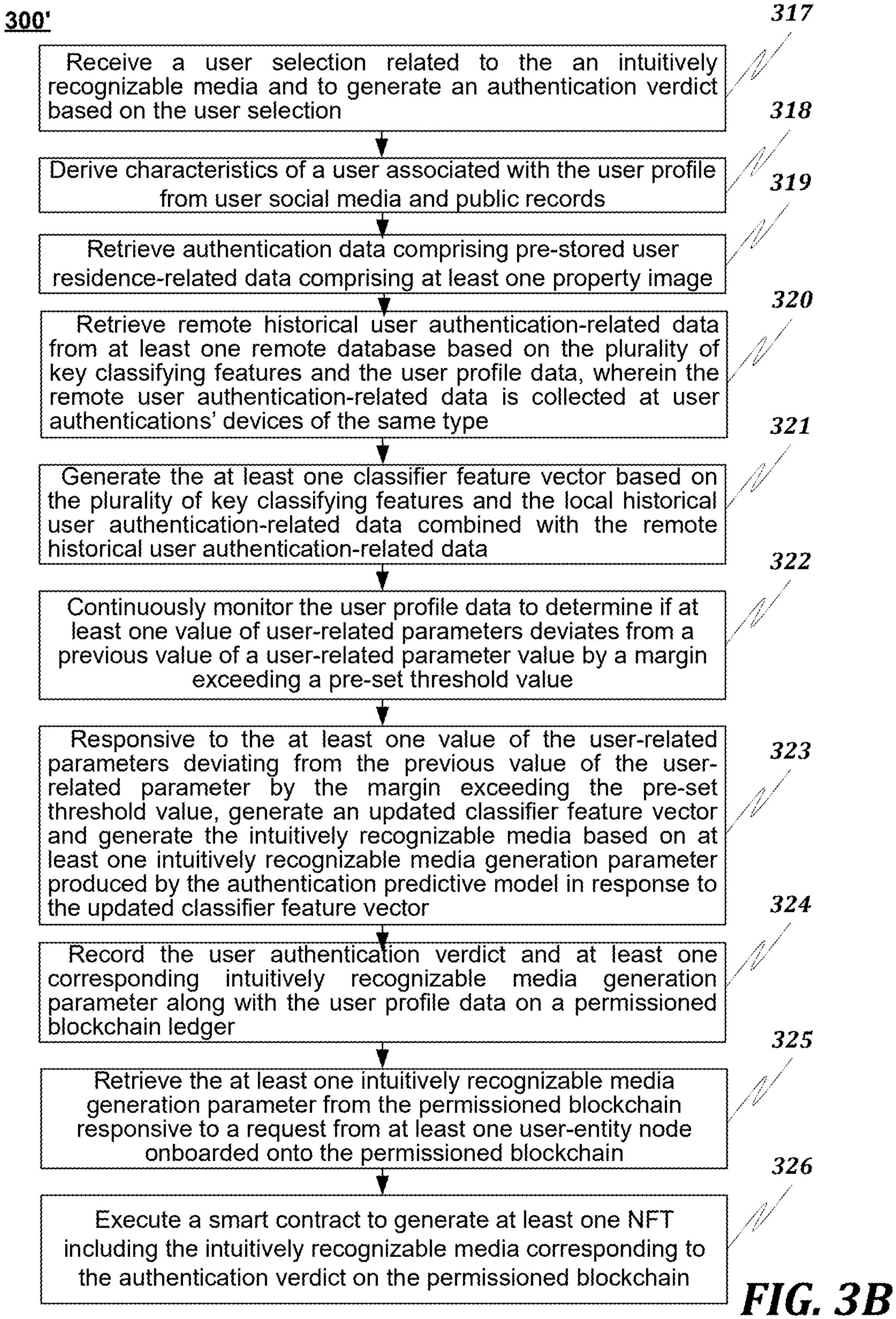
FIG. 3B illustrates a further flowchart of a method for an AI-based visual knowledge authentication based on user-related data consistent with the present disclosure.

FIG. 3B illustrates a further flowchart of a method for an AI-based visual knowledge authentication based on user-related data consistent with the present disclosure.

Referring to FIG. 3B, the method 300' may include one or more of the steps described below. FIG. 3B illustrates a flow chart of an example method executed by the VAS node 102 (see FIG. 2). It should be understood that method 300' depicted in FIG. 3B may include additional operations and that some of the operations described therein may be removed and/or modified without departing from the scope of the method 300'. The description of the method 300' is also made with reference to the features depicted in FIG. 2 for purposes of illustration. Particularly, the processor 204 of the VAS 102 may execute some or all of the operations included in the method 300'.

With reference to FIG. 3B, at block 317, the processor 204 may receive a user selection related to the an intuitively recognizable media and to generate an authentication verdict based on the user selection.

At block 318, the processor 204 may derive characteristics of a user associated with the user profile from user social media and public records. At block 319, the processor 204 may retrieve authentication data comprising pre-stored user residence-related data comprising at least one property image. At block 320, the processor 204 may retrieve remote historical user authentication-related data from at least one remote database based on the plurality of key classifying features and the user profile data, wherein the remote user authentication-related data is collected at user authentications' devices of the same type. At block 321, the processor 204 may generate the at least one classifier feature vector based on the plurality of key classifying features and the local historical user authentication-related data combined with the remote historical user authentication-related data.

At block 322, the processor 204 may continuously monitor the user profile data to determine if at least one value of user-related parameters deviates from a previous value of a user-related parameter value by a margin exceeding a pre-set threshold value. At block 323, the processor 204 may, responsive to the at least one value of the user-related parameters deviating from the previous value of the user-related parameter by the margin exceeding the pre-set threshold value, generate an updated classifier feature vector and generate the intuitively recognizable media based on at least one intuitively recognizable media generation parameter produced by the authentication predictive model in response to the updated classifier feature vector.

At block 324, the processor 204 may record the user authentication verdict and at least one corresponding intuitively recognizable media generation parameter along with the user profile data on a permissioned blockchain ledger. At block 325, the processor 204 may retrieve the at least one intuitively recognizable media generation parameter from the permissioned blockchain responsive to a request from at least one user-entity node onboarded onto the permissioned blockchain. At block 326, the processor 204 may execute a smart contract to generate at least one NFT including the intuitively recognizable media corresponding to the authentication verdict on the permissioned blockchain.

In one disclosed embodiment, the authentication predictive model may be generated by the AI/ML module 107 that may use training data sets to improve accuracy of the prediction of the intuitively recognizable media generation parameters (FIG. 1A). The intuitively recognizable media generation parameters used in training data sets may be stored in a centralized local database (such as one used for storing local authentication data 103 depicted in FIG. 1A). In one embodiment, the ANN may be used by the AI/ML module 107 for intuitively recognizable media generation parameters modeling and authentication verdict generation.

In another embodiment, the AI/ML module 107 may use a decentralized storage such as a blockchain 110 (see FIG. 1B) that is a distributed storage system, which includes multiple nodes that communicate with each other. The decentralized storage includes an append-only immutable data structure resembling a distributed ledger capable of maintaining records between mutually untrusted parties. The untrusted parties are referred to herein as peers or peer nodes. Each peer maintains a copy of the parameter(s) records and no single peer can modify the records without a consensus being reached among the distributed peers. For example, the peers 101, 105 and 102 (FIG. 1B and other authentication nodes not shown) may execute a consensus protocol to validate blockchain 110 storage transactions, group the storage transactions into blocks, and build a hash chain over the blocks. This process forms the ledger 109 by ordering the storage transactions, as is necessary, for consistency. In various embodiments, a permissioned and/or a permissionless blockchain can be used. In a public or permissionless blockchain, anyone can participate without a specific identity. Public blockchains can involve assets and use consensus based on various protocols such as Proof of Work (PoW). On the other hand, a permissioned blockchain provides secure interactions among a group of entities which share a common goal such as storing recommendation parameters, but which do not fully trust one another.

This application utilizes a permissioned (private) blockchain that operates arbitrary, programmable logic, tailored to a decentralized storage scheme and referred to as "smart contracts" or "chaincodes." In some cases, specialized chaincodes may exist for management functions and parameters which are referred to as system chaincodes. The application can further utilize smart contracts that are trusted distributed applications which leverage tamper-proof properties of the blockchain database and an underlying agreement between nodes, which is referred to as an endorsement or endorsement policy. Blockchain transactions associated with this application can be "endorsed" before being committed to the blockchain while transactions, which are not endorsed, are disregarded. An endorsement policy allows chaincodes to specify endorsers for a transaction in the form of a set of peer nodes that are necessary for endorsement. When a client sends the transaction to the peers specified in the endorsement policy, the transaction is executed to validate the transaction. After a validation, the transactions enter an ordering phase in which a consensus protocol is used to produce an ordered sequence of endorsed transactions grouped into blocks.

In the example depicted in FIG. 4, a host platform 420 (such as the VAS node 102) builds and deploys a machine learning model for predictive monitoring of assets 430. Here, the host platform 420 may be a cloud platform, an industrial server, a web server, a personal computer, a user device, and the like. Assets 430 can represent question update parameters. The blockchain 110 can be used to significantly improve both a training process 402 of the machine learning model and the intuitive media generation parameters' predictive process 405 based on a trained machine learning model that uses outputs of the ANN 412. For example, in 402, rather than requiring a data scientist/engineer or other user to collect the data, historical data (heuristics—i.e., user authentication-related data) may be stored by the assets 430 themselves (or through an intermediary, not shown) on the blockchain 110.

This can significantly reduce the collection time needed by the host platform 420 when performing predictive model training. For example, using smart contracts, data can be directly and reliably transferred straight from its place of origin (e.g., from the VAS node 102 or from the databases 103 and 106 depicted in FIGS. 1A-1B) to the blockchain 110. By using the blockchain 110 to ensure the security and ownership of the collected data, smart contracts may directly send the data from the assets to the entities that use the data for building a machine learning model. This allows for sharing of data among the assets 430. The collected data may be stored in the blockchain 110 based on a consensus mechanism. The consensus mechanism pulls in (permissioned nodes) to ensure that the data being recorded is verified and accurate. The data recorded is time-stamped, cryptographically signed, and immutable. It is therefore auditable, transparent, and secure.

Furthermore, training of the machine learning model on the collected data may take rounds of refinement and validation by the host platform 420. Each round may be based on additional data or data that was not previously considered to help expand the knowledge of the machine learning model. In 402, the different training and authentication steps (and the data associated therewith) may be stored on the blockchain 110 by the host platform 420. Each refinement of the machine learning model (e.g., changes in variables, weights, etc.) may be stored on the blockchain 110. This, advantageously, provides verifiable proof of how the model was trained and what data was used to train the model. Furthermore, when the host platform 420 has achieved a finally trained model, the resulting model itself may be stored on the blockchain 110.

After the model has been trained, it may be deployed to a live environment where it can make recommendation-related predictions/decisions based on the execution of the final trained machine learning model using the prediction parameters. In this example, data fed back from the asset 430 may be input into the machine learning model and may be used to make event predictions such as intuitively recognizable media generation parameters based on the recorded user authentications-related data. Determinations made by the execution of the machine learning model (e.g., approval of the authentication verdicts, etc.) at the host platform 420 may be stored on the blockchain 110 to provide auditable/verifiable proof. As one non-limiting example, the machine learning model may predict a future change of a part of the asset 430 (the intuitive media update parameters—i.e., assessment of the user responses). The data behind this decision may be stored by the host platform 420 on the blockchain 110.

As discussed above, in one embodiment, the features and/or the actions described and/or depicted herein can occur on or with respect to the blockchain 110.

The system and method disclosed herein offer several advantages over traditional text-based KBA methods. By utilizing visual and/or intuitively recognizable media answers, it becomes significantly more challenging for AI and bots to commit fraud, as they cannot easily search for and match images and, especially, intuitively recognizable media data compared to text or static images. This approach enhances security by requiring users to rely on visual recognition, a process more intuitive for humans but difficult for automated systems to replicate. Additionally, visual questions can make the authentication process more engaging and user-friendly, potentially improving the overall user experience and accuracy of identity verification.

This, advantageously, leverages the users' ability to recognize images associated with their personal information, such as properties, vehicles, pets or favorite videos or music to verify their identity. By incorporating visual and intuitively recognizable elements, the system aims to make the authentication process more secure and user-friendly, reducing the likelihood of fraud facilitated by AI and bots.

The above embodiments of the present disclosure may be implemented in hardware, in computer-readable instructions executed by a processor, in firmware, or in a combination of the above. The computer computer-readable instructions may be embodied on a computer-readable medium, such as a storage medium. For example, the computer computer-readable instructions may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative embodiment, the processor and the storage medium may reside as discrete components. For example, FIG. 5 illustrates an example computing device (e.g., a server node) 500, which may represent or be integrated in any of the above-described components, etc.

Figure 5:
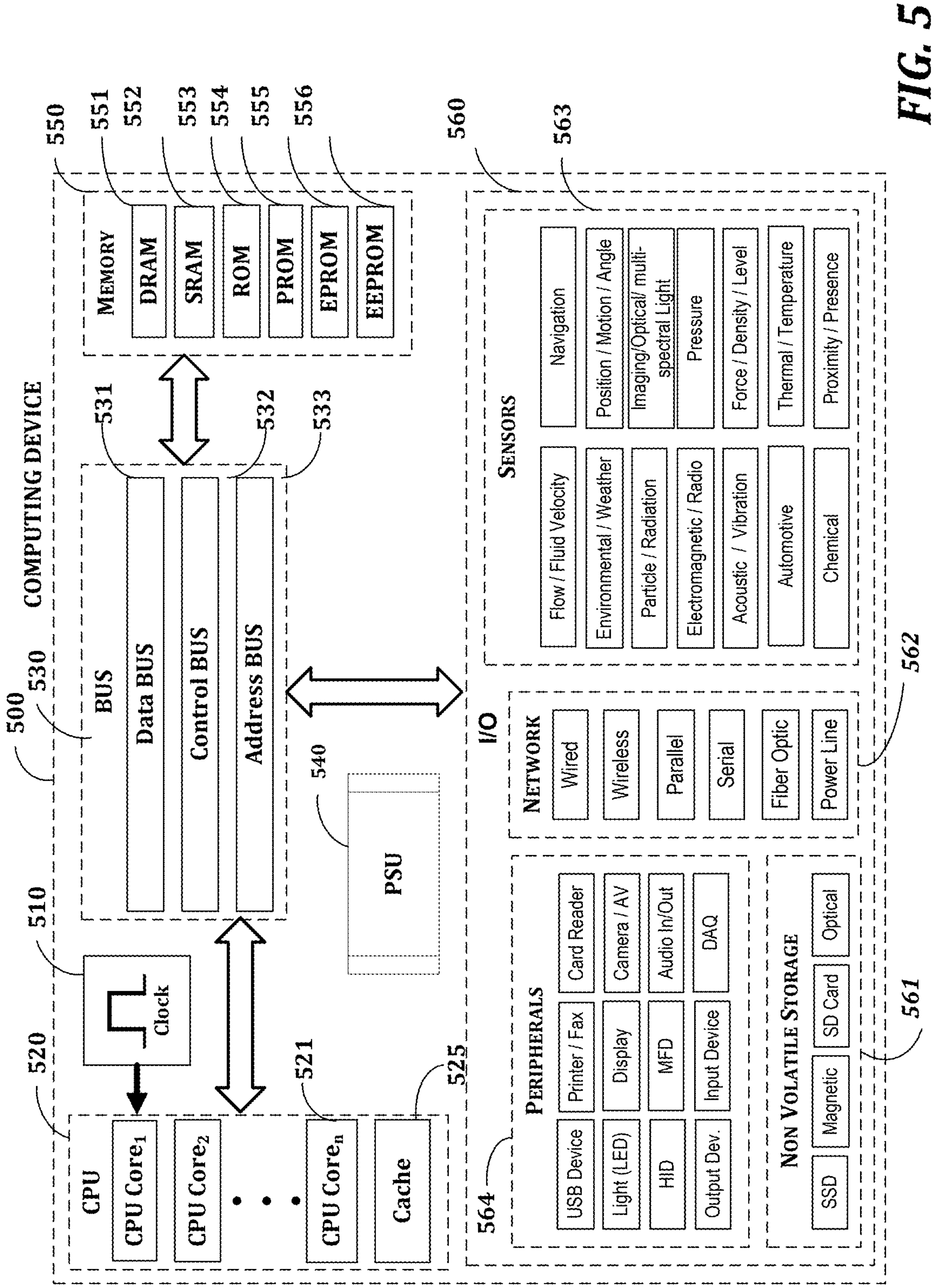
FIG. 5 illustrates a block diagram of a system including a computing device for performing the method of FIGS. 3A and 3B.

FIG. 5 illustrates a block diagram of a system including computing device 500. The computing device 500 may comprise, but not be limited to the following:

- Mobile computing device, such as, but is not limited to, a laptop, a tablet, a smartphone, a drone, a wearable, an embedded device, a handheld device, an Arduino, an industrial device, or a remotely operable recording device;
- A supercomputer, an exa-scale supercomputer, a mainframe, or a quantum computer;
- A minicomputer, wherein the minicomputer computing device comprises, but is not limited to, an IBM AS500/iSeries/System I, A DEC VAX/PDP, a HP3000, a Honeywell-Bull DPS, a Texas Instruments TI-990, or a Wang Laboratories VS Series;
- A microcomputer, wherein the microcomputer computing device comprises, but is not limited to, a server, wherein a server may be rack mounted, a workstation, an industrial device, a raspberry pi, a desktop, or an embedded device;
- The VAS node 102 (see FIG. 2) may be hosted on a centralized server or on a cloud computing service. Although method 300 has been described to be performed by the VAS node 102 implemented on a computing device 500, it should be understood that, in some embodiments, different operations may be performed by a plurality of the computing devices 500 in operative communication at least one network.

Embodiments of the present disclosure may comprise a computing device having a central processing unit (CPU) 520, a bus 530, a memory unit 550, a power supply unit (PSU) 550, and one or more Input/Output (I/O) units. The CPU 520 coupled to the memory unit 550 and the plurality of I/O units 560 via the bus 530, all of which are powered by the PSU 550. It should be understood that, in some embodiments, each disclosed unit may actually be a plurality of such units for the purposes of redundancy, high availability, and/or performance. The combination of the presently disclosed units is configured to perform the stages of any method disclosed herein.

Consistent with an embodiment of the disclosure, the aforementioned CPU 520, the bus 530, the memory unit 550, a PSU 550, and the plurality of I/O units 560 may be implemented in a computing device, such as computing device 500. Any suitable combination of hardware, software, or firmware may be used to implement the aforementioned units. For example, the CPU 520, the bus 530, and the memory unit 550 may be implemented with computing device 500 or any of other computing devices 500, in combination with computing device 500. The aforementioned system, device, and components are examples and other systems, devices, and components may comprise the aforementioned CPU 520, the bus 530, the memory unit 550, consistent with embodiments of the disclosure.

At least one computing device 500 may be embodied as any of the computing elements illustrated in all of the attached figures, including the VAS node 102 (FIG. 2). A computing device 500 does not need to be electronic, nor even have a CPU 520, nor bus 530, nor memory unit 550. The definition of the computing device 500 to a person having ordinary skill in the art is "A device that computes, especially a programmable [usually] electronic machine that performs high-speed mathematical or logical operations or that assembles, stores, correlates, or otherwise processes information." Any device which processes information qualifies as a computing device 500, especially if the processing is purposeful.

With reference to FIG. 5, a system consistent with an embodiment of the disclosure may include a computing device, such as computing device 500. In a basic configuration, computing device 500 may include at least one clock module 510, at least one CPU 520, at least one bus 530, and at least one memory unit 550, at least one PSU 550, and at least one I/O 560 module, wherein I/O module may be comprised of, but not limited to a non-volatile storage sub-module 561, a communication sub-module 562, a sensors sub-module 563, and a peripherals sub-module 565.

A system consistent with an embodiment of the disclosure the computing device 500 may include the clock module 510 may be known to a person having ordinary skill in the art as a clock generator, which produces clock signals. Clock signal is a particular type of signal that oscillates between a high and a low state and is used like a metronome to coordinate actions of digital circuits. Most integrated circuits (ICs) of sufficient complexity use a clock signal in order to synchronize different parts of the circuit, cycling at a rate slower than the worst-case internal propagation delays. The preeminent example of the aforementioned integrated circuit is the CPU 520, the central component of modern computers, which relies on a clock. The only exceptions are asynchronous circuits such as asynchronous CPUs. The clock 510 can comprise a plurality of embodiments, such as, but not limited to, single-phase clock which transmits all clock signals on effectively 1 wire, two-phase clock which distributes clock signals on two wires, each with non-overlapping pulses, and four-phase clock which distributes clock signals on 5 wires.

Many computing devices 500 use a "clock multiplier" which multiplies a lower frequency external clock to the appropriate clock rate of the CPU 520. This allows the CPU 520 to operate at a much higher frequency than the rest of the computer, which affords performance gains in situations where the CPU 520 does not need to wait on an external factor (like memory 550 or input/output 560). Some embodiments of the clock 510 may include dynamic frequency change, where the time between clock edges can vary widely from one edge to the next and back again.

A system consistent with an embodiment of the disclosure the computing device 500 may include the CPU unit 520 comprising at least one CPU Core 521. A plurality of CPU cores 521 may comprise identical CPU cores 521, such as, but not limited to, homogeneous multi-core systems. It is also possible for the plurality of CPU cores 521 to comprise different CPU cores 521, such as, but not limited to, heterogeneous multi-core systems, big. LITTLE systems and some AMD accelerated processing units (APU). The CPU unit 520 reads and executes program instructions which may be used across many application domains, for example, but not limited to, general purpose computing, embedded computing, network computing, digital signal processing (DSP), and graphics processing (GPU). The CPU unit 520 may run multiple instructions on separate CPU cores 521 at the same time. The CPU unit 520 may be integrated into at least one of a single integrated circuit die and multiple dies in a single chip package. The single integrated circuit die and multiple dies in a single chip package may contain a plurality of other aspects of the computing device 500, for example, but not limited to, the clock 510, the CPU 520, the bus 530, the memory 550, and I/O 560.

The CPU unit 520 may contain cache 522 such as, but not limited to, a level 1 cache, level 2 cache, level 3 cache or combination thereof. The aforementioned cache 522 may or may not be shared amongst a plurality of CPU cores 521. The cache 522 sharing comprises at least one of message passing and inter-core communication methods may be used for the at least one CPU Core 521 to communicate with the cache 522. The inter-core communication methods may comprise, but not limited to, bus, ring, two-dimensional mesh, and crossbar. The aforementioned CPU unit 520 may employ symmetric multiprocessing (SMP) design.

The plurality of the aforementioned CPU cores 521 may comprise soft microprocessor cores on a single field programmable gate array (FPGA), such as semiconductor intellectual property cores (IP Core). The plurality of CPU cores 521 architecture may be based on at least one of, but not limited to, Complex instruction set computing (CISC), Zero instruction set computing (ZISC), and Reduced instruction set computing (RISC). At least one of the performance-enhancing methods may be employed by the plurality of the CPU cores 521, for example, but not limited to Instruction-level parallelism (ILP) such as, but not limited to, superscalar pipelining, and Thread-level parallelism (TLP).

Consistent with the embodiments of the present disclosure, the aforementioned computing device 500 may employ a communication system that transfers data between components inside the aforementioned computing device 500, and/or the plurality of computing devices 500. The aforementioned communication system will be known to a person having ordinary skill in the art as a bus 530. The bus 530 may embody internal and/or external plurality of hardware and software components, for example, but not limited to a wire, optical fiber, communication protocols, and any physical arrangement that provides the same logical function as a parallel electrical bus. The bus 530 may comprise at least one of, but not limited to a parallel bus, wherein the parallel bus carry data words in parallel on multiple wires, and a serial bus, wherein the serial bus carry data in bit-serial form. The bus 530 may embody a plurality of topologies, for example, but not limited to, a multidrop/electrical parallel topology, a daisy chain topology, and a connected by switched hubs, such as USB bus. The bus 530 may comprise a plurality of embodiments, for example, but not limited to:

Internal data bus (data bus) 531/Memory bus
Control bus 532
Address bus 533
System Management Bus (SMBus)
Front-Side-Bus (FSB)
External Bus Interface (EBI)
Local bus
Expansion bus
Lightning bus
Controller Area Network (CAN bus)
Camera Link
ExpressCard
Advanced Technology management Attachment (ATA), including embodiments and derivatives such as, but not limited to, Integrated Drive Electronics (IDE)/Enhanced IDE (EIDE), ATA Packet Interface (ATAPI), Ultra-Direct Memory Access (UDMA), Ultra ATA (UATA)/Parallel ATA (PATA)/Serial ATA (SATA), CompactFlash (CF) interface, Consumer Electronics ATA (CE-ATA)/Fiber Attached Technology Adapted (FATA), Advanced Host Controller Interface (AHCI), SATA Express (SATAe)/External SATA (eSATA), including the powered embodiment eSATAp/Mini-SATA (mSATA), and Next Generation Form Factor (NGFF)/M.2.
Small Computer System Interface (SCSI)/Serial Attached SCSI (SAS)
HyperTransport
InfiniBand
RapidIO
Mobile Industry Processor Interface (MIPI)
Coherent Processor Interface (CAPI)
Plug-n-play
1-Wire
Peripheral Component Interconnect (PCI), including embodiments such as, but not limited to, Accelerated Graphics Port (AGP), Peripheral Component Interconnect eXtended (PCI-X), Peripheral Component Interconnect Express (PCI-e) (e.g., PCI Express Mini Card, PCI Express M.2 [Mini PCIe v2], PCI Express External Cabling [ePCIe], and PCI Express OCuLink [Optical Copper{Cu} Link]), Express Card, AdvancedTCA, AMC, Universal IO, Thunderbolt/Mini DisplayPort, Mobile PCIe (M-PCIe), U.2, and Non-Volatile Memory Express (NVMe)/Non-Volatile Memory Host Controller Interface Specification (NVMHCIS).
Industry Standard Architecture (ISA), including embodiments such as, but not limited to Extended ISA (EISA), PC/XT-bus/PC/AT-bus/PC/105 bus (e.g., PC/105-Plus, PCI/105-Express, PCI/105, and PCI-105), and Low Pin Count (LPC).
Music Instrument Digital Interface (MIDI)
Universal Serial Bus (USB), including embodiments such as, but not limited to, Media Transfer Protocol (MTP)/Mobile High-Definition Link (MHL), Device Firmware Upgrade (DFU), wireless USB, InterChip USB, IEEE 1395 Interface/Firewire, Thunderbolt, and eXtensible Host Controller Interface (xHCI).

Consistent with the embodiments of the present disclosure, the aforementioned computing device 500 may employ hardware integrated circuits that store information for immediate use in the computing device 500, known to the person having ordinary skill in the art as primary storage or memory 550. The memory 550 operates at high speed, distinguishing it from the non-volatile storage sub-module 561, which may be referred to as secondary or tertiary storage, which provides slow-to-access information but offers higher capacities at lower cost. The contents contained in memory 550, may be transferred to secondary storage via techniques such as, but not limited to, virtual memory and swap. The memory 550 may be associated with addressable semiconductor memory, such as integrated circuits consisting of silicon-based transistors, used for example as primary storage but also other purposes in the computing device 500. The memory 550 may comprise a plurality of embodiments, such as, but not limited to volatile memory, non-volatile memory, and semi-volatile memory. It should be understood by a person having ordinary skill in the art that the ensuing are non-limiting examples of the aforementioned memory:

- Volatile memory which requires power to maintain stored information, for example, but not limited to, Dynamic Random-Access Memory (DRAM) 551, Static Random-Access Memory (SRAM) 552, CPU Cache memory 525, Advanced Random-Access Memory (A-RAM), and other types of primary storage such as Random-Access Memory (RAM).
- Non-volatile memory which can retain stored information even after power is removed, for example, but not limited to, Read-Only Memory (ROM) 553, Programmable ROM (PROM) 555, Erasable PROM (EPROM) 555, Electrically Erasable PROM (EEPROM) 556 (e.g., flash memory and Electrically Alterable PROM [EAPROM]), Mask ROM (MROM), One Time Programmable (OTP) ROM/Write Once Read Many (WORM), Ferroelectric RAM (FeRAM), Parallel Random-Access Machine (PRAM), Split-Transfer Torque RAM (STT-RAM), Silicon Oxime Nitride Oxide Silicon (SONOS), Resistive RAM (RRAM), Nano RAM (NRAM), 3D XPoint, Domain-Wall Memory (DWM), and millipede memory.
- Semi-volatile memory which may have some limited non-volatile duration after power is removed but loses data after said duration has passed. Semi-volatile memory provides high performance, durability, and other valuable characteristics typically associated with volatile memory, while providing some benefits of true non-volatile memory. The semi-volatile memory may comprise volatile and non-volatile memory and/or volatile memory with battery to provide power after power is removed. The semi-volatile memory may comprise, but not limited to spin-transfer torque RAM (STT-RAM).
- Consistent with the embodiments of the present disclosure, the aforementioned computing device 500 may employ the communication system between an information processing system, such as the computing device 500, and the outside world, for example, but not limited to, human, environment, and another computing device 500. The aforementioned communication system will be known to a person having ordinary skill in the art as I/O 560. The I/O module 560 regulates a plurality of inputs and outputs with regard to the computing device 500, wherein the inputs are a plurality of signals and data received by the computing device 500, and the outputs are the plurality of signals and data sent from the computing device 500. The I/O module 560 interfaces a plurality of hardware, such as, but not limited to, non-volatile storage 561, communication devices 562, sensors 563, and peripherals 565. The plurality of hardware is used by at least one of, but not limited to, human, environment, and another computing device 500 to communicate with the present computing device 500. The I/O module 560 may comprise a plurality of forms, for example, but not limited to channel I/O, port mapped I/O, asynchronous I/O, and Direct Memory Access (DMA).
- Consistent with the embodiments of the present disclosure, the aforementioned computing device 500 may employ the non-volatile storage sub-module 561, which may be referred to by a person having ordinary skill in the art as one of secondary storage, external memory, tertiary storage, off-line storage, and auxiliary storage. The non-volatile storage sub-module 561 may not be accessed directly by the CPU 520 without using an intermediate area in the memory 550. The non-volatile storage sub-module 561 does not lose data when power is removed and may be two orders of magnitude less costly than storage used in memory modules, at the expense of speed and latency. The non-volatile storage sub-module 561 may comprise a plurality of forms, such as, but not limited to, Direct Attached Storage (DAS), Network Attached Storage (NAS), Storage Area Network (SAN), nearline storage, Massive Array of Idle Disks (MAID), Redundant Array of Independent Disks (RAID), device mirroring, off-line storage, and robotic storage. The non-volatile storage sub-module (561) may comprise a plurality of embodiments, such as, but not limited to:
- Optical storage, for example, but not limited to, Compact Disk (CD) (CD-ROM/CD-R/CD-RW), Digital Versatile Disk (DVD) (DVD-ROM/DVD-R/DVD+R/DVD-RW/DVD+RW/DVD±RW/DVD+R DL/DVD-RAM/HD-DVD), Blu-ray Disk (BD) (BD-ROM/BD-R/BD-RE/BD-R DL/BD-RE DL), and Ultra-Density Optical (UDO).
- Semiconductor storage, for example, but not limited to, flash memory, such as, but not limited to, USB flash drive, Memory card, Subscriber Identity Module (SIM) card, Secure Digital (SD) card, Smart Card, CompactFlash (CF) card, Solid-State Drive (SSD) and memristor.
- Magnetic storage such as, but not limited to, Hard Disk Drive (HDD), tape drive, carousel memory, and Card Random-Access Memory (CRAM).
- Phase-change memory
- Holographic data storage such as Holographic Versatile Disk (HVD).
- Molecular Memory
- Deoxyribonucleic Acid (DNA) digital data storage Consistent with the embodiments of the present disclosure, the aforementioned computing device 500 may employ the communication sub-module 562 as a subset of the I/O 560, which may be referred to by a person having ordinary skill in the art as at least one of, but not limited to, computer network, data network, and network. The network allows computing devices 500 to exchange data using connections, which may be known to a person having ordinary skill in the art as data links, between network nodes. The nodes comprise network computer devices 500 that originate, route, and terminate data. The nodes are identified by network addresses and can include a plurality of hosts consistent with the embodiments of a computing device 500. The aforementioned embodiments include, but not limited to personal computers, phones, servers, drones, and networking devices such as, but not limited to, hubs, switches, routers, modems, and firewalls.

Two nodes can be networked together, when one computing device 500 is able to exchange information with the other computing device 500, whether or not they have a direct connection with each other. The communication sub-module 562 supports a plurality of applications and services, such as, but not limited to World Wide Web (WWW), digital video and audio, shared use of application and storage computing devices 500, printers/scanners/fax machines, email/online chat/instant messaging, remote control, distributed computing, etc. The network may comprise a plurality of transmission mediums, such as, but not limited to conductive wire, fiber optics, and wireless. The network may comprise a plurality of communications protocols to organize network traffic, wherein application-specific communications protocols are layered, may be known to a person having ordinary skill in the art as carried as payload, over other more general communications protocols. The plurality of communications protocols may comprise, but not limited to, IEEE 802, ethernet, Wireless LAN (WLAN/Wi-Fi), Internet Protocol (IP) suite (e.g., TCP/IP, UDP, Internet Protocol version 5 [IPv5], and Internet Protocol version 6 [IPv6]), Synchronous Optical Networking (SONET)/Synchronous Digital Hierarchy (SDH), Asynchronous Transfer Mode (ATM), and cellular standards (e.g., Global System for Mobile Communications [GSM], General Packet Radio Service [GPRS], Code-Division Multiple Access [CDMA], and Integrated Digital Enhanced Network [IDEN]).

The communication sub-module 562 may comprise a plurality of size, topology, traffic control mechanism and organizational intent. The communication sub-module 562 may comprise a plurality of embodiments, such as, but not limited to:

- Wired communications, such as, but not limited to, coaxial cable, phone lines, twisted pair cables (ethernet), and InfiniBand.
- Wireless communications, such as, but not limited to, communications satellites, cellular systems, radio frequency/spread spectrum technologies, IEEE 802.11 Wi-Fi, Bluetooth, NFC, free-space optical communications, terrestrial microwave, and Infrared (IR) communications. Cellular systems embody technologies such as, but not limited to, 3G,5G (such as WiMax and LTE), and 5G (short and long wavelength).
- Parallel communications, such as, but not limited to, LPT ports.
- Serial communications, such as, but not limited to, RS-232 and USB.
- Fiber Optic communications, such as, but not limited to, Single-mode optical fiber (SMF) and Multi-mode optical fiber (MMF).
- Power Line and wireless communications The aforementioned network may comprise a plurality of layouts, such as, but not limited to, bus network such as ethernet, star network such as Wi-Fi, ring network, mesh network, fully connected network, and tree network. The network can be characterized by its physical capacity or its organizational purpose. Use of the network, including user authorization and access rights, differ accordingly. The characterization may include, but not limited to nanoscale network, Personal Area Network (PAN), Local Area Network (LAN), Home Area Network (HAN), Storage Area Network (SAN), Campus Area Network (CAN), backbone network, Metropolitan Area Network (MAN), Wide Area Network (WAN), enterprise private network, Virtual Private Network (VPN), and Global Area Network (GAN).

Consistent with the embodiments of the present disclosure, the aforementioned computing device 500 may employ the sensors sub-module 563 as a subset of the I/O 560. The sensors sub-module 563 comprises at least one of the devices, modules, and subsystems whose purpose is to detect events or changes in its environment and send the information to the computing device 500. Sensors are sensitive to the measured property, are not sensitive to any property not measured, but may be encountered in its application, and do not significantly influence the measured property. The sensors sub-module 563 may comprise a plurality of digital devices and analog devices, wherein if an analog device is used, an Analog to Digital (A-to-D) converter must be employed to interface the said device with the computing device 500. The sensors may be subject to a plurality of deviations that limit sensor accuracy. The sensors sub-module 563 may comprise a plurality of embodiments, such as, but not limited to, chemical sensors, automotive sensors, acoustic/sound/vibration sensors, electric current/electric potential/magnetic/radio sensors, environmental/weather/moisture/humidity sensors, flow/fluid velocity sensors, ionizing radiation/particle sensors, navigation sensors, position/angle/displacement/distance/speed/acceleration sensors, imaging/optical/light sensors, pressure sensors, force/density/level sensors, thermal/temperature sensors, and proximity/presence sensors. It should be understood by a person having ordinary skill in the art that the ensuing are non-limiting examples of the aforementioned sensors:

Chemical sensors, such as, but not limited to, breathalyzer, carbon dioxide sensor, carbon monoxide/smoke detector, catalytic bead sensor, chemical field-effect transistor, chemiresistor, electrochemical gas sensor, electronic nose, electrolyte-insulator-semiconductor sensor, energy-dispersive X-ray spectroscopy, fluorescent chloride sensors, holographic sensor, hydrocarbon dew point analyzer, hydrogen sensor, hydrogen sulfide sensor, infrared point sensor, ion-selective electrode, nondispersive infrared sensor, microwave chemistry sensor, nitrogen oxide sensor, olfactometer, optode, oxygen sensor, ozone monitor, pellistor, pH glass electrode, potentiometric sensor, redox electrode, zinc oxide nanorod sensor, and biosensors (such as nano-sensors).

Automotive sensors, such as, but not limited to, air flow meter/mass airflow sensor, air-fuel ratio meter, AFR sensor, blind spot monitor, engine coolant/exhaust gas/cylinder head/transmission fluid temperature sensor, hall effect sensor, wheel/automatic transmission/turbine/vehicle speed sensor, airbag sensors, brake fluid/engine crankcase/fuel/oil/tire pressure sensor, camshaft/crankshaft/throttle position sensor, fuel/oil level sensor, knock sensor, light sensor, MAP sensor, oxygen sensor (o2), parking sensor, radar sensor, torque sensor, variable reluctance sensor, and water-in-fuel sensor.

- Acoustic, sound and vibration sensors, such as, but not limited to, microphone, lace sensor (guitar pickup), seismometer, sound locator, geophone, and hydrophone.
- Electric current, electric potential, magnetic, and radio sensors, such as, but not limited to, current sensor, Daly detector, electroscope, electron multiplier, faraday cup, galvanometer, hall effect sensor, hall probe, magnetic anomaly detector, magnetometer, magnetoresistance, MEMS magnetic field sensor, metal detector, planar hall sensor, radio direction finder, and voltage detector.
- Environmental, weather, moisture, and humidity sensors, such as, but not limited to, actinometer, air pollution sensor, bedwetting alarm, ceilometer, dew warning, electrochemical gas sensor, fish counter, frequency domain sensor, gas detector, hook gauge evaporimeter, humistor, hygrometer, leaf sensor, lysimeter, pyranometer, pyrgeometer, psychrometer, rain gauge, rain sensor, seismometers, SNOTEL, snow gauge, soil moisture sensor, stream gauge, and tide gauge.

Flow and fluid velocity sensors, such as, but not limited to, air flow meter, anemometer, flow sensor, gas meter, mass flow sensor, and water meter.

Ionizing radiation and particle sensors, such as, but not limited to, cloud chamber, Geiger counter, Geiger-Muller tube, ionization chamber, neutron detection, proportional counter, scintillation counter, semiconductor detector, and thermos-luminescent dosimeter.

Navigation sensors, such as, but not limited to, air speed indicator, altimeter, attitude indicator, depth gauge, fluxgate compass, gyroscope, inertial navigation system, inertial reference unit, magnetic compass, MHD sensor, ring laser gyroscope, turn coordinator, variometer, vibrating structure gyroscope, and yaw rate sensor.

Position, angle, displacement, distance, speed, and acceleration sensors, such as, but not limited to, accelerometer, displacement sensor, flex sensor, free fall sensor, gravimeter, impact sensor, laser rangefinder, LIDAR, odometer, photoelectric sensor, position sensor such as, but not limited to, GPS or Glonass, angular rate sensor, shock detector, ultrasonic sensor, tilt sensor, tachometer, ultra-wideband radar, variable reluctance sensor, and velocity receiver.

Imaging, optical and light sensors, such as, but not limited to, CMOS sensor, LiDAR, multi-spectral light sensor, colorimeter, contact image sensor, electro-optical sensor, infra-red sensor, kinetic inductance detector, LED as light sensor, light-addressable potentiometric sensor, Nichols radiometer, fiber-optic sensors, optical position sensor, thermopile laser sensor, photodetector, photodiode, photomultiplier tubes, phototransistor, photoelectric sensor, photoionization detector, photomultiplier, photoresistor, photo-switch, phototube, scintillometer, Shack-Hartmann, single-photon avalanche diode, superconducting nanowire single-photon detector, transition edge sensor, visible light photon counter, and wavefront sensor.

Pressure sensors, such as, but not limited to, barograph, barometer, boost gauge, bourdon gauge, hot filament ionization gauge, ionization gauge, McLeod gauge, Oscillating U-tube, permanent downhole gauge, piezometer, Pirani gauge, pressure sensor, pressure gauge, tactile sensor, and time pressure gauge.

Force, Density, and Level sensors, such as, but not limited to, bhangmeter, hydrometer, force gauge or force sensor, level sensor, load cell, magnetic level or nuclear density sensor or strain gauge, piezo capacitive pressure sensor, piezoelectric sensor, torque sensor, and viscometer.

Thermal and temperature sensors, such as, but not limited to, bolometer, bimetallic strip, calorimeter, exhaust gas temperature gauge, flame detection/pyrometer, Gardon gauge, Golay cell, heat flux sensor, microbolometer, microwave radiometer, net radiometer, infrared/quartz/resistance thermometer, silicon bandgap temperature sensor, thermistor, and thermocouple.

Proximity and presence sensors, such as, but not limited to, alarm sensor, doppler radar, motion detector, occupancy sensor, proximity sensor, passive infrared sensor, reed switch, stud finder, triangulation sensor, touch switch, and wired glove.

Consistent with the embodiments of the present disclosure, the aforementioned computing device 500 may employ the peripherals sub-module 562 as a subset of the I/O 560. The peripheral sub-module 565 comprises ancillary devices used to put information into and get information out of the computing device 500. There are 3 categories of devices comprising the peripheral sub-module 565, which exist based on their relationship with the computing device 500, input devices, output devices, and input/output devices. Input devices send at least one of data and instructions to the computing device 500. Input devices can be categorized based on, but not limited to:

Modality of input, such as, but not limited to, mechanical motion, audio, visual, and tactile.

Whether the input is discrete, such as but not limited to, pressing a key, or continuous such as, but not limited to position of a mouse.

The number of degrees of freedom involved, such as, but not limited to, two-dimensional mice vs three-dimensional mice used for Computer-Aided Design (CAD) applications.

Output devices provide output from the computing device 500. Output devices convert electronically generated information into a form that can be presented to humans. Input/output devices that perform both input and output functions. It should be understood by a person having ordinary skill in the art that the ensuing are non-limiting embodiments of the aforementioned peripheral sub-module 565:

Input Devices

Human Interface Devices (HID), such as, but not limited to, pointing device (e.g., mouse, touchpad, joystick, touchscreen, game controller/gamepad, remote, light pen, light gun, Wii remote, jog dial, shuttle, and knob), keyboard, graphics tablet, digital pen, gesture recognition devices, magnetic ink character recognition, Sip-and-Puff (SNP) device, and Language Acquisition Device (LAD).

High degree of freedom devices, that require up to six degrees of freedom such as, but not limited to, camera gimbals, Cave Automatic Virtual Environment (CAVE), and virtual reality systems.

Video Input devices are used to digitize images or video from the outside world into the computing device 500. The information can be stored in a multitude of formats depending on the user's requirement. Examples of types of video input devices include, but not limited to, digital camera, digital camcorder, portable media player, webcam, Microsoft Kinect, image scanner, fingerprint scanner, barcode reader, 3D scanner, laser rangefinder, eye gaze tracker, computed tomography, magnetic resonance imaging, positron emission tomography, medical ultrasonography, TV tuner, and iris scanner.

Audio input devices are used to capture sound. In some cases, an audio output device can be used as an input device, in order to capture produced sound. Audio input devices allow a user to send audio signals to the computing device 500 for at least one of processing, recording, and carrying out commands. Devices such as microphones allow users to speak to the computer in order to record a voice message or navigate software. Aside from recording, audio input devices are also used with speech recognition software. Examples of types of audio input devices include, but not limited to microphone, Musical Instrument Digital Interface (MIDI) devices such as, but not limited to a keyboard, and headset.

Data Acquisition (DAQ) devices convert at least one of analog signals and physical parameters to digital values for processing by the computing device 500. Examples of DAQ devices may include, but not limited to, Analog to Digital Converter (ADC), data logger, signal conditioning circuitry, multiplexer, and Time to Digital Converter (TDC).

Output Devices may further comprise, but not be limited to:

Display devices, which convert electrical information into visual form, such as, but not limited to, monitor, TV, projector, and Computer Output Microfilm (COM). Display devices can use a plurality of underlying technologies, such as, but not limited to, Cathode-Ray Tube (CRT), Thin-Film Transistor (TFT), Liquid Crystal Display (LCD), Organic Light-Emitting Diode (OLED), MicroLED, E Ink Display (ePaper) and Refreshable Braille Display (Braille Terminal).

Printers, such as, but not limited to, inkjet printers, laser printers, 3D printers, solid ink printers and plotters.

Audio and Video (AV) devices, such as, but not limited to, speakers, headphones, amplifiers and lights, which include lamps, strobes, DJ lighting, stage lighting, architectural lighting, special effect lighting, and lasers.

Other devices such as Digital to Analog Converter (DAC)

Input/Output Devices may further comprise, but not be limited to, touchscreens, networking device (e.g., devices disclosed in network 562 sub-module), data storage device (non-volatile storage 561), facsimile (FAX), and graphics/sound cards.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as examples for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

What is claimed is:

1. A system for an automated visual knowledge authentication based on user-related data, comprising:

a processor of a visual authentication server (VAS) node configured to host a machine learning (ML) module and connected to at least one user-entity node over a network; and a memory on which are stored machine-readable instructions that when executed by the processor, cause the processor to:

receive an authentication request comprising user profile data from the at least one user-entity node;

derive the user profile data from the authentication request;

parse the user profile data to derive a plurality of key classifying features;

query a local authentication database to retrieve local historical user authentication-related data based on the plurality of key classifying features;

generate at least one classifier feature vector based on the plurality of key classifying features and the local historical user authentication-related data;

provide the at least one classifier feature vector to the ML module configured to generate an authentication predictive model for producing at least one recognizable media generation parameter;

generate a recognizable media for the at least one user-entity node based on the at least one recognizable media generation parameter;

continuously monitor the user profile data to determine if at least one value of user-related parameters deviates from a previous value of a user-related parameter value by a margin exceeding a pre-set threshold value; and responsive to the at least one value of the user-related parameters deviating from the previous value of the user-related parameter by the margin exceeding the pre-set threshold value, generate an updated classifier feature vector and generate the recognizable media based on at least one recognizable media generation parameter produced by the authentication predictive model in response to the updated classifier feature vector.

2. The system of claim 1, wherein the recognizable media comprising any of:

(a) live video data related to a user associated with the at least one user-entity node;

(b) imaging data related to the user associated with the at least one user-entity node;

(c) audio data related to the user associated with the at least one user-entity node;

(d) textual data related to the user associated with the at least one user-entity node; and a combination of (a), (b), (c) and (d).

3. The system of claim 1, wherein the machine-readable instructions that when executed by the processor, cause the processor to receive a user selection related to the recognizable media and to generate an authentication verdict based on the user selection.

4. The system of claim 1, wherein the machine-readable instructions that when executed by the processor, cause the processor to derive characteristics of a user associated with the user profile from user social media and public records.

5. The system of claim 4, wherein the machine-readable instructions that when executed by the processor, cause the processor to retrieve authentication data comprising pre-stored user residence-related data comprising at least one property image.

6. The system of claim 1, wherein the machine-readable instructions that when executed by the processor, cause the processor to retrieve remote historical user authentication-related data from at least one remote database based on the plurality of key classifying features and the user profile data, wherein the remote historical user authentication-related data is collected at user authentications' devices of the same type.

7. The system of claim 6, wherein the machine-readable instructions that when executed by the processor, cause the processor to generate the at least one classifier feature vector based on the plurality of key classifying features and the local historical user authentication-related data combined with the remote historical user authentication-related data.

8. The system of claim 3, wherein the machine-readable instructions that when executed by the processor, further cause the processor to record the user authentication verdict and at least one corresponding recognizable media generation parameter along with the user profile data on a permissioned blockchain ledger.

9. The system of claim 8, wherein the machine-readable instructions that when executed by the processor, further cause the processor to retrieve the at least one recognizable media generation parameter from the permissioned blockchain responsive to a request from at least one user-entity node onboarded onto the permissioned blockchain.

10. The system of claim 9, wherein the machine-readable instructions that when executed by the processor, further cause the processor to execute a smart contract to generate at least one non-fungible token (NFT) including the recognizable media corresponding to the authentication verdict on the permissioned blockchain.

11. A method for an automated visual knowledge authentication based on user-related data, comprising:

receiving, by a visual authentication server (VAS) node configured to host a machine learning (ML) module, an authentication request comprising user profile data from at least one user-entity node;

deriving, by the VAS node, the user profile data from the authentication request;

parsing, by the VAS node, the user profile data to derive a plurality of key classifying features;

querying, by the VAS node, a local authentication database to retrieve local historical user authentication-related data based on the plurality of key classifying features;

generating, by the VAS node, at least one classifier feature vector based on the plurality of key classifying features and the local historical user authentication-related data;

providing, by the VAS node, the at least one classifier feature vector to the ML module configured to generate an authentication predictive model for producing at least one recognizable media generation parameter;

generating, by the VAS node, a recognizable media for the at least one user-entity node based on the at least one recognizable media generation parameter-;

continuously monitoring the user profile data to determine if at least one value of user-related parameters deviates from a previous value of a user-related parameter value by a margin exceeding a pre-set threshold value; and responsive to the at least one value of the user-related parameters deviating from the previous value of the user-related parameter by the margin exceeding the pre-set threshold value, generating an updated classifier feature vector and generating the recognizable media based on at least one recognizable media generation parameter produced by the authentication predictive model in response to the updated classifier feature vector.

12. The method of claim 11, further comprising to receiving a user selection related to the recognizable media and generating an authentication verdict based on the user selection.

13. The method of claim 11, further comprising deriving characteristics of a user associated with the user profile from user social media and public records.

14. The method of claim 11, further comprising retrieve remote historical user authentication-related data from at least one remote database based on the plurality of key classifying features and the user profile data, wherein the remote historical user authentication-related data is collected at user authentications' devices of the same type.

15. The method of claim 14, further comprising generating the at least one classifier feature vector based on the plurality of key classifying features and the local historical user authentication-related data combined with the remote historical user authentication-related data.

16. A non-transitory computer-readable medium comprising instructions, that when read by a processor, cause the processor to perform:

receiving an authentication request comprising user profile data from at least one user-entity node;

deriving the user profile data from the authentication request;

parsing the user profile data to derive a plurality of key classifying features;

querying a local authentication database to retrieve local historical user authentication-related data based on the plurality of key classifying features;

generating at least one classifier feature vector based on the plurality of key classifying features and the local historical user authentication-related data;

providing the at least one classifier feature vector to a machine learning module configured to generate an authentication predictive model for producing at least one recognizable media generation parameter;

generating a recognizable media for the at least one user-entity node based on the at least one recognizable media generation parameter-;

continuously monitoring the user profile data to determine if at least one value of user-related parameters deviates from a previous value of a user-related parameter value by a margin exceeding a pre-set threshold value; and responsive to the at least one value of the user-related parameters deviating from the previous value of the user-related parameter by the margin exceeding the pre-set threshold value, generating an updated classifier feature vector and generating the recognizable media based on at least one recognizable media generation parameter produced by the authentication predictive model in response to the updated classifier feature vector.

* * * * *